A. BOZEK.
BEET PLANTER.
APPLICATION FILED NOV. 21, 1918.

1,295,845.

Patented Mar. 4, 1919.
3 SHEETS—SHEET 2.

Inventor
A. BOZEK.
By H. S. Kie
Attorney

A. BOZEK.
BEET PLANTER.
APPLICATION FILED NOV. 21, 1918.

1,295,845.

Patented Mar. 4, 1919.
3 SHEETS—SHEET 3.

Inventor
A. BOZEK.
H. S. Hiel
Attorney

UNITED STATES PATENT OFFICE.

ALBERT BOZEK, OF GEBO, WYOMING.

BEET-PLANTER.

1,295,845.

Specification of Letters Patent.

Patented Mar. 4, 1919.

Application filed November 21, 1918. Serial No. 263,576.

*To all whom it may concern:*

Be it known that I, ALBERT BOZEK, a citizen of the United States, residing at Gebo, in the county of Hot Springs, State of Wyoming, have invented a new and useful Beet-Planter; and I do hereby declare the following to be a full, clear, and exact description of the invention, such as will enable others skilled in the art to which it appertains to make and use the same.

The present invention relates to a seed planting machine, and has for its object to provide a device of this character which is especially adapted for planting beet seeds, and which embodies novel features of construction whereby the seeds can be dropped at periodic intervals into a furrow of the proper depth and subsequently covered with loose soil.

Further objects of the invention are to provide a beet planter which is comparatively simple and inexpensive in its construction, which can be readily drawn across a field by horses or draft animals, which can be regulated to drop the seeds at greater or smaller intervals of space, and which provides for lifting the furrow opening frame above the surface of the ground when moving the planter to and from the field.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Fig. 7 is an enlarged detail view of the lower end of one of the seed spouts, portions being broken away and shown in section to illustrate more clearly the valve which controls the lower end of the feed spout.

Fig. 8 is a detail view of the cam means for periodically opening the valve of the seed spout.

Fig. 9 is a top plan view of one of the furrow openers, portions being broken away and shown in section.

Fig. 10 is a detail view of the crank shaft member to which the forward ends of the furrow openers are loosely connected.

Corresponding and like parts are referred to in the following description and indicated in all the views of the drawings by the same reference characters.

Figure 1:
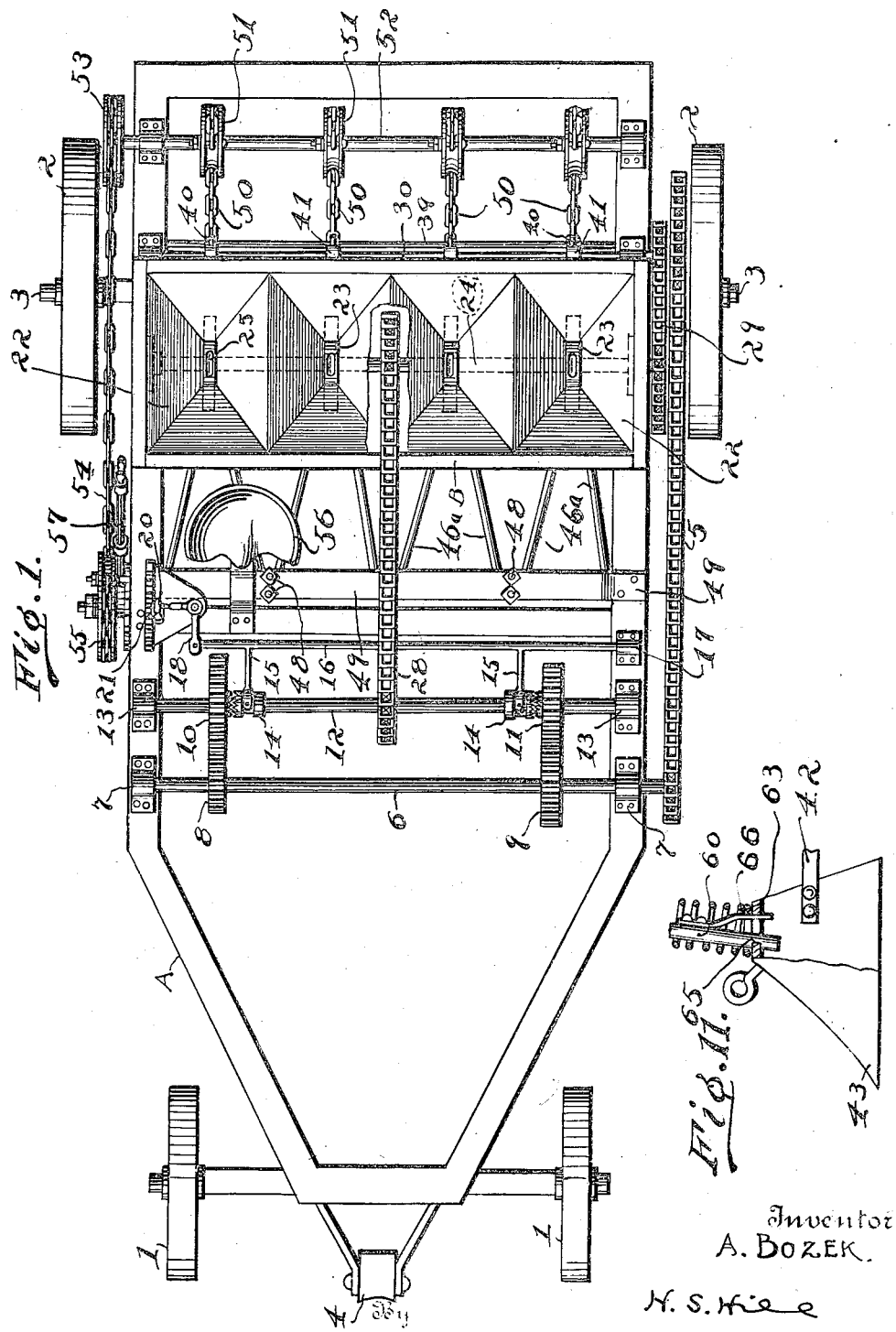
Figure 1 is a top plan view of a beet planter which is constructed in accordance with the invention, a portion of the hopper being broken away.
Figure 2:
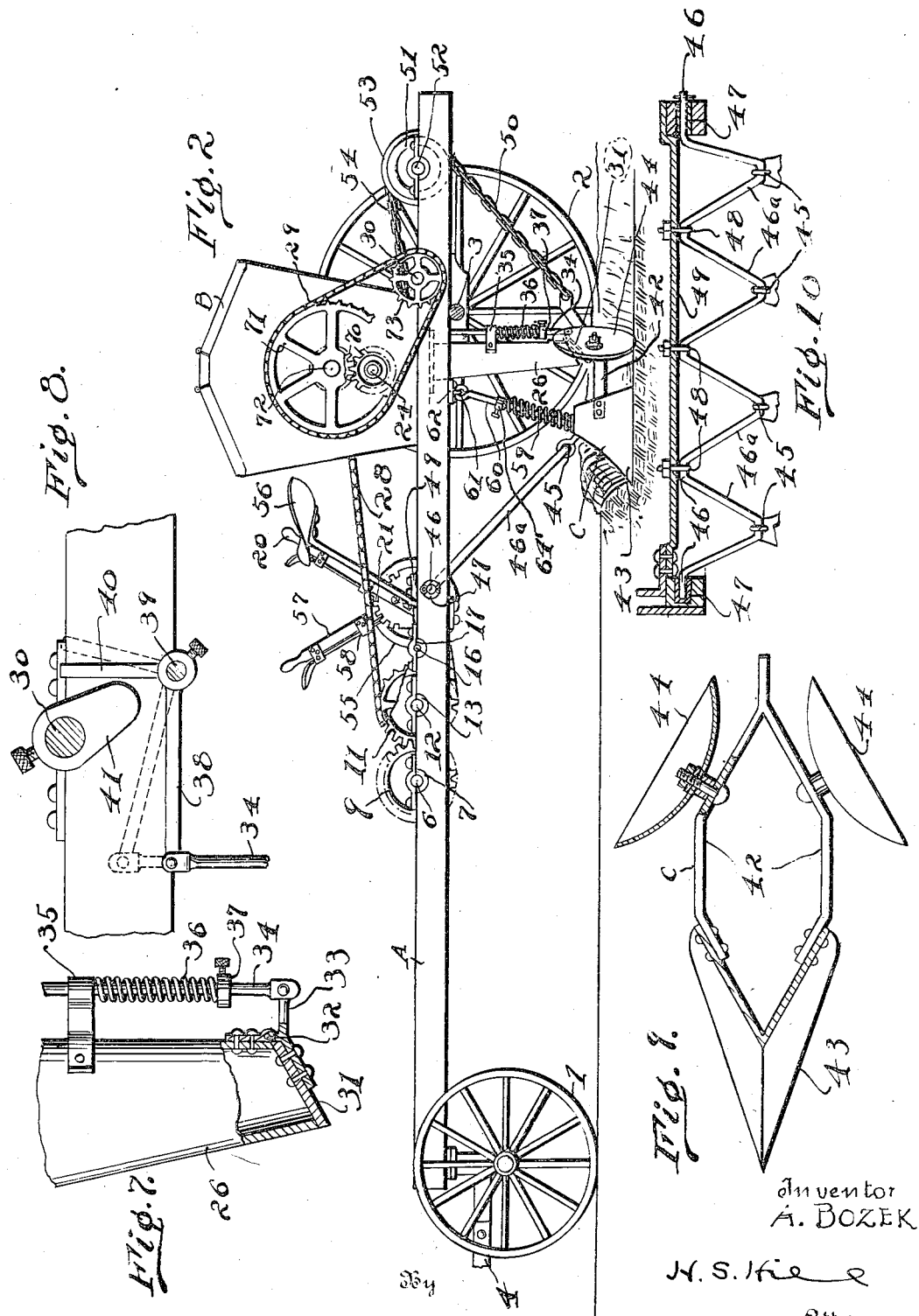
Fig. 2 is a side elevation of the beet planter with portions of the gear wheels removed to illustrate more clearly the details of the gearing for driving the mechanism.

Specifically describing the present embodiment of the invention, the reference character A designates the main frame of the planter, the forward end thereof being tapered and supported upon front wheels 1, while the rear end thereof is supported upon rear wheels 2 which are applied to the rear axle 3. A tongue 4 is shown as extending forwardly from the front of the machine, and this tongue provides means for attaching the draft animals which are to be utilized for pulling the planter across a field. One of the rear wheels 2 has a chain and sprocket connection 5 with a drive shaft 6 which extends transversely across the forward end of the frame and is journaled within suitable bearings 7. Opposite end portions of the drive shaft 6 are provided with gear wheels 8 and 9 which are of different sizes and mesh with corresponding gear wheels 10 and 11 which are loose on a counter-shaft 12, said counter-shaft being journaled within suitable bearings 13. Clutch members 14 are provided for locking either one of the gear wheels 10 or 11 with the counter-shaft 12, and these clutch members or collars 13 are shown as engaged by shifting arms 15 projecting from a longitudinal slidable rod 16. One end of this rod is slidable within a sleeve 17, while the other end thereof is pivotally connected to a bell crank lever 18 which is horizontally disposed and has a pin and slot connection 19 with an upwardly extending clutch control lever 20. Conventional latch means 21 are provided to lock the lever 20 in an adjusted position. When this lever is in an intermediate position, both of the sliding clutch collars 14 are inoperative and the two gear wheels 10 and 11 both turn freely upon the counter-shaft 12. However, when the clutch control lever is moved in one direction one of the clutch sleeves 14 is moved into a locking engagement with the gear wheel 10, while when the lever 20 is moved in the opposite direction the other clutch sleeve 14 is moved into engagement with the gear wheel 11. Owing to the fact that the two sets of gears between the drive shaft 6 and the counter-shaft 12 have a different ratio, it will be understood that the counter-shaft will turn at one speed when the gear wheel 10 is locked therewith, and at another speed when the gear wheel 11 is locked therewith.

A seed hopper B extends transversely across the frame A, and the bottom 22 of the seed receiving compartment in the upper end of the hopper is shaped to provide a series of pockets which converge into small openings across which the peripheries of seed dropping wheels 23 rotate when the mechanism is in operation. These wheels 23 are rigid with a transverse shaft 24 and are each provided with uniformly spaced peripheral recesses 25 of a suitable shape and size to receive a predetermined number of beet seeds. As each of the recesses 25 passes under the opening in the bottom of the hopper it will be filled with seeds which will be carried beyond the confines of the opening and dropped into a guide spout 26 which projects downwardly below the seed dropping wheel. Suitable guide walls 27 which are of a substantially funnel-shaped formation are provided for directing the seeds into the spout 26 as they are dropped from the recesses 25 of the wheels 23. It will be understood that a seed dropping wheel 23 and downwardly extending guide spout 26 is provided for each of the pockets in the bottom of the hopper and that the number of these seed dropping units may be increased or decreased to any desired extent without departing from the spirit of the invention.

The shaft 24 upon which the seed dropping wheels 23 are mounted has a chain and sprocket connection 28 at its middle portion with the counter-shaft 12, so that when either one of the clutch members 14 is thrown into operative position the seed dropping mechanism is put into operation, although the rotation of the seed dropping wheels will be slower with the gears 8 and 10 in operation, with the result that the seeds will be dropped at greater intervals than when the gears 9 and 11 are in operation. One end of the seed dropping shaft 24 is geared at 70 to a sprocket wheel 71 which is loose on a stub shaft 72. A sprocket chain 29 connects this sprocket wheel 71 to a sprocket wheel 73 on a cam shaft 30 which controls the valves or trap doors 31 at the lower ends of the guide spouts 26. These valves 31 are each pivoted at 32 at the rear side of the spout 26, and provided with a rearwardly extending arm 33 which is connected to a plunger 34. The plungers 34 operate through guides 35 and are provided with springs 36 which engage set collars 37 on the plungers and normally hold the valves 31 in a closed position. The upper ends of the several spring actuated plungers 34 are connected to crank arms 38 projecting from a trip shaft 39, said shaft being provided with a trip finger 40 which projects into the path of a cam 41 on the cam shaft 30. This cam 41 will engage the trip finger 40 on each revolution of the cam shaft and rock the trip shaft 39 to momentarily open all of the valves 31. The seeds which may have collected in the lower ends of the guide spouts 26 will thus be dropped, after which the valves 31 will be closed by the action of the springs 36. The gearing between the cam shaft 30 and the seed dropping shaft 24 is such that each charge of seeds deposited in the spout 26 from one of the recesses 25 in the seed dropping wheel 23 will be collected as a unit at the lower end of the spout upon the valve 31 and subsequently dropped into the furrow by the opening of the valve, before another charge of seeds enters the spout. Each charge of seeds will thus be held together and prevented from becoming separated in such a manner as to be deposited in the furrow in an irregular manner.

Figure 3:
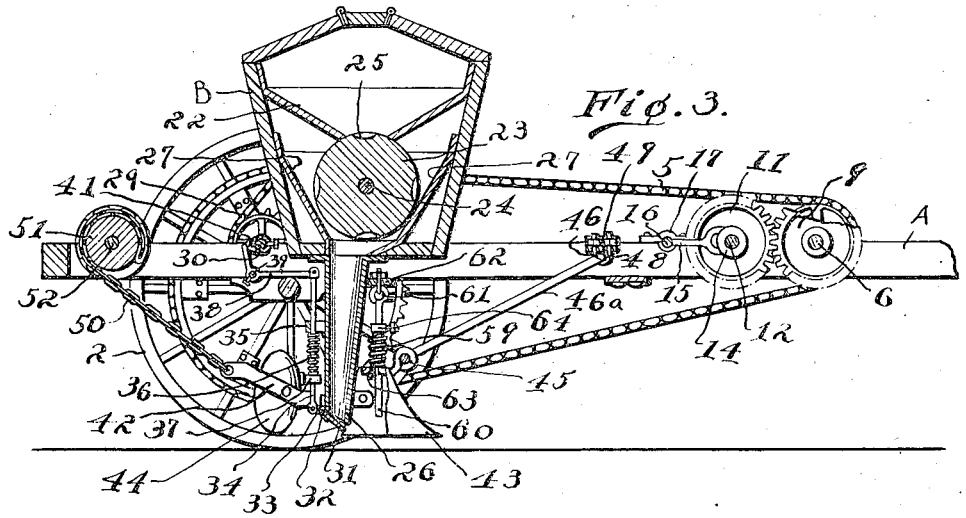
Fig. 3 is a longitudinal sectional view through the machine.
Figure 4:
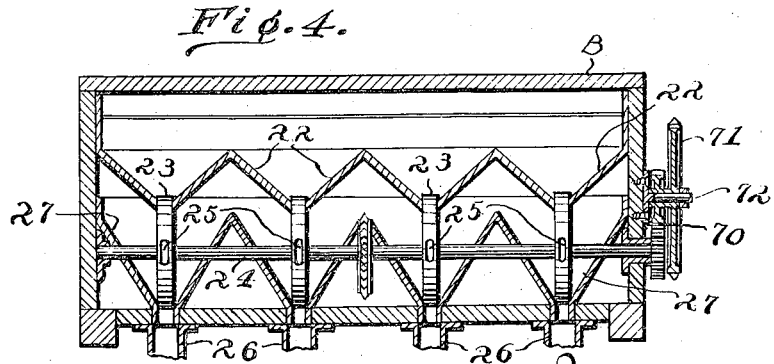
Fig. 4 is a transverse vertical sectional view through the seed hopper, showing the seed dropping wheels.
Figure 5:
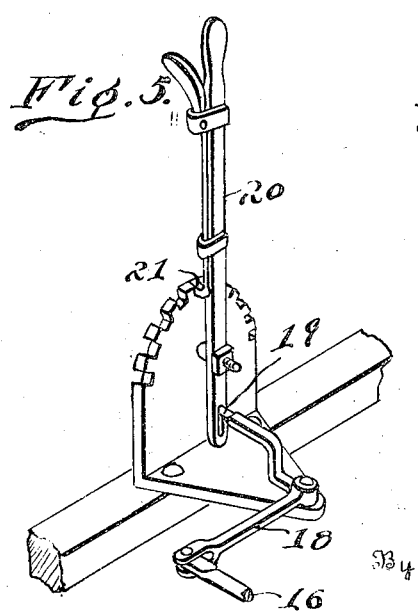
Fig. 5 is a detail view of the clutch controlling lever by means of which the seed dropping mechanism is thrown into and out of gear.
Figure 6:
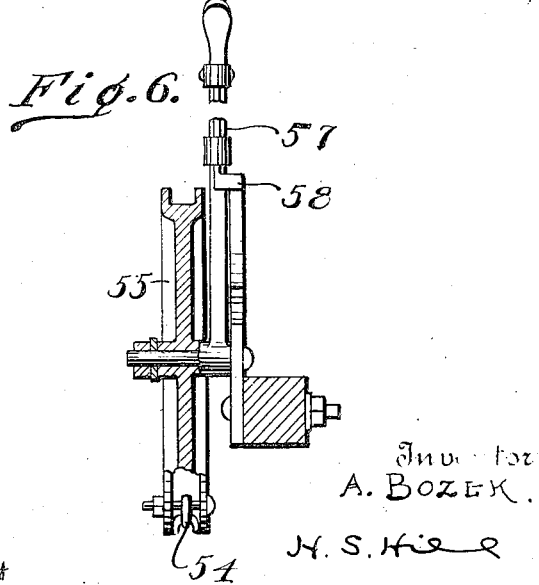
Fig. 6 is a detail view of the lever which is provided for raising and lowering the furrow opener.

Mounted under each of the guide spouts 26 is a furrow opener C which includes a substantially horizontally disposed open frame 42 having a pointed shovel 43 secured to the forward end thereof. At the rear of the frame the sides thereof converge and have covering disks 44 mounted thereon. The forward end of each of the furrow openers is loosely connected by an eye 45 to one of the V-shaped crank portions 46ª of the crank shaft 46, the latter being journaled within bearings 47 at opposite sides of the frame, and loosely connected at intervals in its length by means of U-bolts 48 to a cross bar 49 extending across the frame. These V-shaped crank portions 46ª of the crank shaft operate as links to direct the furrow opener C in its up and down movements. The rear end of each of the furrow openers is connected by a chain cable 50 to a pulley 51 on a transverse shaft 52 which is mounted at the rear end of the main frame A. One end of the pulley shaft 52 is provided with a pulley 53 which is connected by a forwardly extending cable 54 to a pulley 55 which is suitably mounted at a point adjacent the driver's seat 56. This pulley 55 is rigid with a lever 57 (see Fig. 6), and a suitable latch means 58 is provided for locking the lever in an adjusted position. With this construction it will be obvious that by manipulating the lever 57 the pulley shaft 52 can be rotated so that all of the cables 50 will be taken in or let out. When the cables are taken in the furrow openers C will be drawn rearwardly and simultaneously swung upwardly, owing to the swinging action of the V-shaped crank portions 46ª of the crank shaft 46. The furrow opener C can thus be swung upwardly into inoperative position, as indicated by Fig. 3, when moving the planter toward and away from the field. When the cables 50 are unwound from the pulleys 51 and let out, the furrow opener C will drop into operative position, being forcibly moved downwardly by springs 59 on guide rods 60. The upper ends of these guide rods 60 are loosely connected at 61 to a cross bar 62, while the lower ends thereof pass loosely through openings in plates 63 at the upper portions of the furrow opening shovels 43. The springs 59 are interposed between set collars 64 and the plates 63 and normally tend to move the furrow openers downwardly into operative position. When the furrow openers are in operative position, latch means may be provided if such is desired for the purpose of positively locking them against upward movement. For this purpose the lower end of each of the guide rods 60 is shown as notched at 65 to engage an edge of the plate 63, and is provided opposite the notch with a spring arm 66 to hold the notched portion of the arm in operative position. The furrow openers are thus held positively in operative position, although when it is desired to raise them above the surface of the ground it is merely necessary to swing the rods 60 slightly against the action of the spring arms 66 to release the notches 65 from the edges of the openings in the plates 63. The lever 57 can then be manipulated to rotate the pulley shaft 52 and wind the cables 50 on the pulleys 51, thereby raising the furrow openers into inoperative position against the action of the springs 59. When the furrow openers are thus raised above the surface of the ground the planter can be readily moved from place to place. The use of this planter will result in a great saving in seed, since it has been found that it only requires about one third of the usual quantity of seed to plant a field. It also reduces the labor of thinning out the beets, since this can be accomplished with much greater ease than where the beets are originally planted too thickly.

Having thus described the invention, what I claim as new and desire to secure by Letters Patent, is:—

1. A planter including a main frame, a seed hopper thereon, a guide tube extending downwardly from the seed hopper, means for dropping the seeds from the hopper into the guide tube, an open frame receiving the tube, a forwardly extending link loosely connecting the open frame to the main frame, a furrow opening shovel on the open frame, a cable extending rearwardly from the open frame, means coöperating with the cable to raise and lower the open frame, and means for locking the frame in a lowered position.

2. A planter including a main frame, a seed hopper thereon, a guide tube extending downwardly from the hopper, means for depositing seeds from the hopper into the guide tube, a furrow opening frame loosely receiving the guide tube, a shovel on the furrow opening frame, covering means carried by the said frame, a forwardly extending link connecting the furrow opening frame to the main frame, a guide rod extending downwardly from the main frame and slidably engaging the furrow opener, said guide rod being adapted to interlock with the furrow opener to hold the latter in operative position, and means for swinging the furrow opener upwardly into inoperative position.

3. A planter including a main frame, a seed hopper thereon, a guide tube extending downwardly from the hopper, means for dropping the seeds from the hopper into the guide tube, a furrow opening frame loosely receiving the guide tube, a furrow opening shovel thereon, covering means carried by the said frame, a forwardly extending link loosely connecting the furrow opener to the main frame, a guide rod extending downwardly from the main frame and slidably engaging the furrow opener, said guide rod being constructed to interlock with the furrow opener to hold the same in operative position, a spring carried by the guide rod and normally tending to move the furrow opener downwardly into operative position, and means for swinging the furrow opener upwardly into inoperative position.

4. A planter including a main frame, a seed hopper thereon, a guide tube extending downwardly therefrom, means for dropping seeds from the hopper into the guide tube, a furrow opening frame loosely receiving the guide tube, a furrow opening shovel carried by the frame, covering means carried by the frame, a forwardly extending link loosely connecting the furrow opener to the main frame, a guide rod extending downwardly from the main frame and slidably engaging the furrow opener, said guide rod having a notched lower end adapted to interlock with the furrow opener to hold the furrow opener in operative position, a spring applied to the guide rod and engaging the furrow opener to move it downwardly into operative position, a cable connected to the furrow opening frame, and means coöperating with the cable to swing the furrow opening frame upwardly into inoperative position.

5. A planter including a main frame, a seed hopper thereon, a guide tube extending downwardly from the hopper, means for dropping seeds from the hopper into the guide tube, a furrow opening frame locsely receiving the lower end of the guide tube, a furrow opening shovel on the said frame, covering disks on the frame, a forwardly extending link loosely connecting the furrow opener to the main frame, a guide rod extending downwardly from the main frame and slidably engaging the furrow opener, the lower end of the guide rod being notched to interlock with the furrow opener and hold the latter in operative position, yielding means on the guide rod for forcing the furrow opener downwardly into operative position, a cable connected to the rear end of the furrow opener, and means coöperating with the cable to swing the furrow opener upwardly into inoperative position.

In testimony whereof I have signed my name to this specification in the presence of two subscribing witnesses.

ALBERT BOZEK.

Witnesses:
GEORGE W. DALLY,
M. E. CONGDON.